March 4, 1941. E. AGER-WICK Re. 21,732

ADJUSTABLE CANDLESTICK

Original Filed March 10, 1937

Inventor

Emil Ager-Wick

By M. Bjerndal

Atty.

Reissued Mar. 4, 1941

Re. 21,732

UNITED STATES PATENT OFFICE 21,732

ADJUSTABLE CANDLESTICK

Emil Ager-Wick, Arendal, Norway

Original No. 2,163,137, dated June 20, 1939, Serial No. 129,998, March 10, 1937. Application for reissue November 24, 1939, Serial No. 306,717. In Norway November 18, 1936

6 Claims. (Cl. 67—23)

My invention relates to an improvement in candlesticks providing self-centering means adjustable to hold any size candle with a tight grip and in a perfectly perpendicular position. The objects of my invention are: To provide an adjustable receptacle for the end of the candle suitable to hold any size candle with a tight grip, to provide means for automatically centering the candle in the candle holder to prevent dripping by holding the candle prefectly perpendicular, to provide such self-centering and gripping means which will not in any way detract from the artistic appearance of the candlestick, and to provide such adjustable means at a minimum cost. Other objects of this invention will be apparent during the course of the following description.

In the accompanying drawing, forming part of this specification, and in which like numerals are employed to designate like parts throughout the same.

Figure 1:
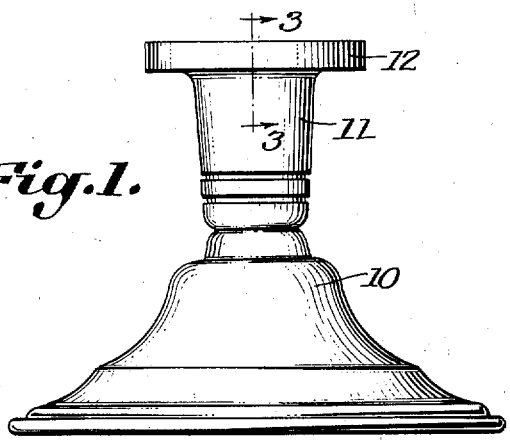
Figure 1 is a side elevation of a candlestick embodying my invention.
Figure 3:
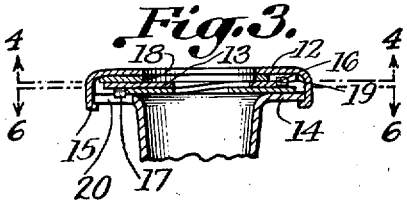
Figure 5:
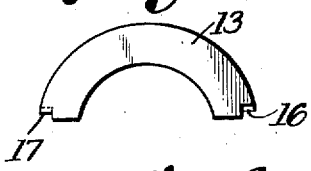
Figure 4:
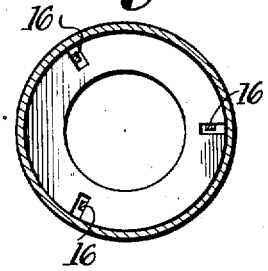
Figure 6:
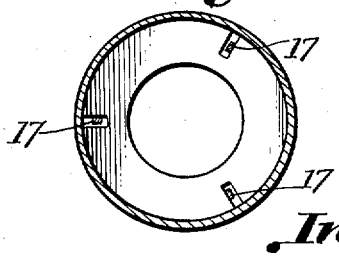

Figure 3 is a partial section of the candle receptacle along the line 3—3 in Fig. 1, Figure 4 is a section along line 4—4 in Fig. 3, Figure 5 is a plan view of one of the receptacle jaws, and, Figure 6 is a section along the line 6—6 in Fig. 3.

Figure 2:
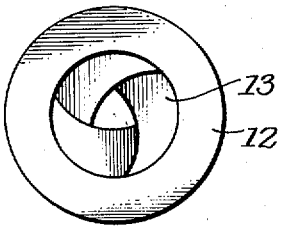
Figure 2 is a top view of the assembled candle receptacle.

In the drawing, where for the purpose of illustration, is shown a preferred embodiment of my invention, the numeral 10 designates the base of the candlestick which may be of any conventional design. The candle receptacle 11 has a downwardly narrowing, conical shape and the top of same is covered by the cap 12 which has a central opening upward, as shown in Fig. 2. The upper end of the conical candle receptacle has a flange 14 fitting into the cap 12, the lower edge 15 of the cap 12 being spun over the flange 14, but free to turn on same, as indicated in section in Fig. 3. Between the flange 14 and the cap 12 are placed three segments or jaws 13 of shape as shown in Fig. 5. These segments 13 have each two projections, one 16 turned perpendicular to the plane of 13 in one direction, and one 17 turned perpendicular to 13 in the opposite direction. Inside and directly under the cap 12 is fastened a washer 18 having three slots 19, see Fig. 4, and similar slots 20 are cut in the flange 14 as shown in Fig. 6.

The three segments, or jaws, 13 are placed between the washer 18 and the flange 14 in a manner so that the projections 16 and 17 are engaged in the slots 19 and 20 in, respectively, the washer 18 and the flange 14. A slight turn of the cap 12 thus will give the ends of the segments 13 which are held in slots 19 a circular motion. These segments however are held at the other end in slots 20, and a slight turn of the cap 12 will therefore cause a uniform motion of all three segments toward or away from the central axis of the candlestick, as indicated in Fig. 2.

The operation of my invention is as follows: The three segments 13 act similarly to the jaws in a universal chuck. Due to the fact that all three segments are identical, and make identical motions for a given angular displacement of the cap 12, the inside edges of these segments 13 will always remain equidistant from the central axis of the candle receptacle. A body, such as a candle, when placed between the jaws 13 may be held tight by turning the cap 12 until the jaws touch or dig into the sides of the candle. The conical shape of the receptacle 11 will furthermore automatically centre the lower end of the candle and thus insure that the same will be held in a perfectly perpendicular position. The action of the chuck-jaws 13 may best be described as being similar to that of the iris diaphragm commonly used in cameras, although widely varying jaws may be used without departing from the scope of the present invention.

Having thus described my invention what I claim as new and wish to secure by Letters Patent of the United States is as follows:

1. In a candlestick, the combination of a base; a smaller shell fastened to the top of said base, a flange surrounding the top of said smaller shell and having a plurality of radially extending slots therein, a plurality of thin segmentary washers, each provided with a tab extending from the plane thereof at either end, on top of said flange and with said tabs at one end of said segmentary washers engaged in said radially extending slots; a circular washer, having a plurality of radially extending slots therein, on top of said segmentary washers, and with the tabs of the other ends of said segmentary washers engaged upwardly through said radial slots of said circular washer, and a cap, cupped and spun over said washers and attached to and turnable on said flange, said circular washer being attached to said cap.

2. In a candlestick, the combination of a base; a smaller shell fastened to the top of said base, a flange surrounding the top of said shell; a circular washer having a plurality of radially extending, rectangular slots therein, on said flange, attached thereto, and concentric therewith; a plurality of thin segmentary washers, each provided with a tab extending from the plane thereof at either end, on top of said circular washer and with said tabs at one end of said segmentary washers engaged in said radially extending slots; a second circular washer, identical with the first, on top of said segmentary washers, and with the tabs of the other ends of said segmentary washers engaged upwardly through said radial slots of said second circular washer, and a cap, cupped and spun over said washers and attached to and turnable on said flange, said circular washer being attached to said cap.

3. In a candlestick, the combination of a base; a smaller shell fastened to the top of said base, a flange surrounding the top of said smaller shell and having three radially extending slots therein, three thin segmentary washers, each provided with a tab extending from the plane thereof at either end, on top of said flange and with said tabs at one end of said segmentary washers engaged in said radially extending slots; a circular washer, having 3 radially extending slots therein, on top of said segmentary washers, and with the tabs of the other ends of said segmentary washers engaged upwardly through said radial slots of said circular washer, and a cap, cupped and spun over said washers and attached to and turnable on said flange, said circular washer being attached to said cap.

4. In a candlestick, the combination of a base; a smaller shell fastened to the top of said base, a flange surrounding the top of said smaller shell; a circular washer having three radially extending, rectangular slots therein, on said flange, and concentric with said flange and attached thereto; three thin segmentary washers, each provided with a tab extending from the plane thereof at either end, on top of said circular washer and with said tabs at one end of said segmentary washers engaged in said radially extending slots; a second circular washer, identical with the first, on top of said segmentary washers, and with the tabs of the other ends of said segmentary washers engaged upwardly through said radial slots of said second circular washer, and a cap, cupped and spun over said washers and attached to and turnable on said flange, said circular washer being attached to said cap.

5. In a candlestick, the combination of a base; a smaller shell fastened to the top of said base, a flange surrounding the top of said smaller shell and a washer attached to said flange having three small radially extending slots therein, three thin segmentary washers, each provided with a tab extending from the plane thereof at either end, on top of said flange and with said tabs at one end of said segmentary washers engaged in said radially extending rectangular slots; a circular washer having a plurality of radially extending rectangular slots therein, on top of said segmentary washers, and with the tabs of the other ends of said segmentary washers engaged upwardly through said radial rectangular slots of said circular washer, and a cap, cupped and spun over said other washers and attached to and turnable on said flange, said circular washer being attached to said cap.

6. In a candlestick, the combination of a conical base; a smaller conical shell fastened to the top of said conical base, and with its apex directed downwardly against the apex of the conical base; a flange surrounding the top of said smaller conical shell; a circular washer with three small radially extending, rectangular slots placed on top of said flange, and concentric with same, said circular washer being attached to said flange; three thin segmentary washers, each with a tab extending from the plane of the washer at either end, placed on top of said circular washer and with said tabs at one end of said segmentary washers engaged in said radially extending rectangular slots; a second circular washer, identical with the first, placed on top of said segmentary washers, and with the tabs of the other end of these segmentary washers engaged upwardly through said radial rectangular slots of said second circular washer, and a top washer, cupped and spun over said other washers and attached to and turnable on said flange of said upwardly directed conical shell, said second circular washer being attached to said top washer.

EMIL AGER-WICK.